United States Patent
Zohar et al.

(10) Patent No.: US 7,836,266 B2
(45) Date of Patent: Nov. 16, 2010

(54) MANAGING SNAPSHOT HISTORY IN A DATA STORAGE SYSTEM

(75) Inventors: Ofir Zohar, Alfe-Menashe (IL); Shemer Schwartz, Herzelia (IL); Efri Zeidner, Kiryat Mozkin (IL)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 11/229,954

(22) Filed: Sep. 19, 2005

(65) Prior Publication Data

US 2007/0067583 A1    Mar. 22, 2007

(51) Int. Cl.
*G06F 12/00* (2006.01)
*G06F 13/00* (2006.01)
*G06F 13/28* (2006.01)

(52) U.S. Cl. .................. 711/162; 711/161; 711/170; 711/171; 711/172; 711/173

(58) Field of Classification Search ............. 711/141, 711/161–162, 165, 170–173; 707/200–206
See application file for complete search history.

(56) References Cited

U.S. PATENT DOCUMENTS

| | | | |
|---|---|---|---|
| 5,379,391 A * | 1/1995 | Belsan et al. ............. 711/114 |
| 5,897,661 A | 4/1999 | Baranovsky et al. |
| 5,956,731 A * | 9/1999 | Bamford et al. .......... 707/201 |
| 5,964,874 A * | 10/1999 | Gross et al. ............... 713/100 |
| 6,088,764 A | 7/2000 | Shyam et al. |
| 6,513,102 B2 | 1/2003 | Garrett et al. |
| 6,574,703 B1 | 6/2003 | Don et al. |
| 6,687,718 B2 | 2/2004 | Gagne et al. |
| 6,742,138 B1 | 5/2004 | Gagne et al. |
| 6,779,094 B2 | 8/2004 | Selkirk et al. |
| 6,779,095 B2 | 8/2004 | Selkirk et al. |
| 6,820,099 B1 | 11/2004 | Huber et al. |
| 6,839,827 B1 | 1/2005 | Beardsley et al. |
| 6,898,681 B2 * | 5/2005 | Young ....................... 711/162 |
| 6,944,732 B2 * | 9/2005 | Thunquest et al. ........ 711/162 |
| 6,996,682 B1 * | 2/2006 | Milligan et al. .......... 711/141 |
| 7,191,304 B1 * | 3/2007 | Cameron et al. .......... 711/202 |
| 7,577,806 B2 * | 8/2009 | Rowan et al. ............. 711/162 |

(Continued)

OTHER PUBLICATIONS

Bruce Lindsay, Laura Haas, C. Mohan, Hamid Pirahesh, Paul Wilms, "A Snapshot Differential Refresh Algorithm"—IBM Almaden Research Center, 1986, ACM, pp. 53-60.*

*Primary Examiner*—Sanjiv Shah
*Assistant Examiner*—Yaima Campos
(74) *Attorney, Agent, or Firm*—Griffiths & Seaton PLLC (57) ABSTRACT

A method for creating logical volume snapshots in a data storage system, including receiving a first write command to write first data to a partition of a logical volume, generating a first partition descriptor record (PDR), and storing the first data at a first physical location associated with the first PDR. A snapshot command is then received to form a snapshot of the logical volume, after which a second write command is received to write second data to the partition. In response to the second write command, a second PDR is generated and the second data is stored at a second physical location associated with the second PDR. A pointer between the first PDR and the second PDR is generated. In response to a read command indicating a number of a desired snapshot of the logical volume, the first PDR is accessed using the pointer.

16 Claims, 9 Drawing Sheets

U.S. PATENT DOCUMENTS

| | | | |
|---|---|---|---|
| 7,620,666 B1 * | 11/2009 | Root et al. | 1/1 |
| 2002/0019920 A1 * | 2/2002 | Reuter et al. | 711/203 |
| 2003/0158863 A1 * | 8/2003 | Haskin et al. | 707/200 |
| 2003/0195864 A1 | 10/2003 | Vishlitzky et al. | |
| 2003/0195887 A1 | 10/2003 | Vishlitzky et al. | |
| 2003/0208463 A1 | 11/2003 | Vishlitzky et al. | |
| 2004/0268067 A1 * | 12/2004 | Yamagami | 711/159 |
| 2005/0063374 A1 | 3/2005 | Rowan et al. | |
| 2005/0065962 A1 | 3/2005 | Rowan et al. | |
| 2005/0066222 A1 | 3/2005 | Rowan et al. | |
| 2005/0076261 A1 | 4/2005 | Rowan et al. | |
| 2005/0076262 A1 | 4/2005 | Rowan et al. | |
| 2005/0289309 A1 * | 12/2005 | Suzuki | 711/162 |
| 2006/0242371 A1 * | 10/2006 | Shono et al. | 711/162 |

* cited by examiner

LOGICAL VOLUME RECORDS — 43

| VOLUME NAME | | SIZE | GLOBAL COUNTER |
|---|---|---|---|
| V1 | | 100 | 0 |
| V1 | | 100 | 1 |

50 — first data row; 52 — second data row

FIG. 3B

PARTITION DESCRIPTOR RECORDS — 40

| LINK ADDRESS (70) | PRIOR LINK (72) | FORWARD LINK (74) | VOLUME (76) | PARTITION (78) | SNAPSHOT INDICATOR (82) | PHYSICAL ADDRESS (84) |
|---|---|---|---|---|---|---|
| P00001 | | | V1 | P1 | 0 | PY0001 |
| P00001 | | P00002 | V1 | P1 | 0 | PY0001 |
| P00002 | P00001 | | V1 | P1 | 1 | PY0002 |

SET 1 — 62
SET 2 — 64, 66

| | LINK ADDRESS ~70 | LEFT LINK ~292 | RIGHT LINK ~294 | PARENT LINK ~296 | VOLUME ~78 | PARTITION ~80 | SNAPSHOT INDICATOR ~82 | PHYSICAL ADDRESS ~84 |
|---|---|---|---|---|---|---|---|---|
| 276 | P00001 | | | P00002 | V1 | P1 | 0 | PHYYY01 |
| 278 | P00002 | P00001 | P00003 | P00004 | V1 | P1 | 1 | PHYYY02 |
| 280 | P00003 | | | P00002 | V1 | P1 | 2 | PHYYY03 |
| 282 | P00004 | P00002 | P00006 | P00008 | V1 | P1 | 3 | PHYYY04 |
| 284 | P00005 | | | P00006 | V1 | P1 | 4 | PHYYY05 |
| 286 | P00006 | P00005 | P00007 | P00004 | V1 | P1 | 5 | PHYYY06 |
| 288 | P00007 | | | P00006 | V1 | P1 | 6 | PHYYY07 |
| 272 | P00008 | | P00004 | | V1 | P1 | 7 | PHYYY08 |

PARTITION DESCRIPTOR RECORDS

40

MANAGING SNAPSHOT HISTORY IN A DATA STORAGE SYSTEM

FIELD OF THE INVENTION

The present invention relates generally to methods and apparatus for data storage. More particularly, the present invention relates to methods and apparatus for maintaining data associated with timestamps or counters in data storage systems.

BACKGROUND OF THE INVENTION

Data storage systems are used to store data on physical media in a manner that is transparent to host computers. From the perspective of a host computer, data is stored at logical addresses located on file systems, or logical volumes, of the storage system. The file systems or logical volumes are typically configured to store the data required for a specific data processing application. Data storage systems map the logical addresses to addressable physical locations on storage media, such as direct access hard disks. In a typical configuration, physical locations comprise tracks on a hard disk, and a track can typically store many blocks of data.

Snapshots of a logical volume reflect the status of data stored in the logical volume at an instant of time. Snapshots are often used to generate copies of logical volumes for testing purposes or for restoring the logical volumes. Typically a snapshot is implemented without physically copying all data in the logical volume. Rather, the snapshot is defined, and data comprising the snapshot is kept at the original physical location. When a command is subsequently received to write new data at the original location, the old data representing the data from the time of the snapshot is preserved.

Snapshots may also be referred to as instant copies, though generally snapshots refer to copies that are accessible in a read-only manner, whereas instant copies typically have read and write capabilities.

U.S. Pat. No. 6,779,094 to Selkirk, et al., whose disclosure is incorporated herein by reference, describes various instant copy mechanisms for copying data upon receiving a write operation to either original or copied data. Upon receiving a write operation for writing new data to a first data location, the new data is written to a second data location. Multiple layers of mapping tables provide unique identification of the storage location of the data such that individual entries in the mapping tables are variable and may be self-defining.

U.S. Pat. No. 6,779,095 to Selkirk, et al., whose disclosure is incorporated herein by reference, describes the use of a plurality of layers of mapping tables for storing data. The mapping tables provide unique identifications of locations of the data. When the data is copied, the physical placement of the original data is described by a mapping mechanism referred to as the original data map. This identifies the physical storage location used to store the original data. The physical placement of the copy data is described by a mapping mechanism referred to as the copy data map. This identifies the physical storage location used to store the copy data.

U.S. Patent Publications 2003/0195887 and 2003/0208463 to Vishlitzky, et al., whose disclosures are incorporated herein by reference, describe a storage device containing a first storage area of a first type containing data and a second storage area of a second type containing a table of pointers to the data provided in the storage area of the first type. The second storage area is a virtual storage area containing no sections of data and represents a copy of the data of the first storage area at a point in time.

U.S. Pat. No. 6,820,099 to Huber, et al., whose disclosure is incorporated herein by reference, describes the use of a snapshot volume to update a primary, or "base," logical volume. Updates are made to the snapshot volume while the base volume is still used to satisfy normal data access requests. After the updating of the snapshot is complete, the snapshot is "rolled back" to the base volume. During rollback, updated data are available from either the snapshot or from the base volume, and thus the updating appears to be instantaneous.

U.S. Pat. No. 6,687,718 to Gagne, et al., whose disclosure is incorporated herein by reference, describes transferring data from a data altering apparatus, such as a production data processing site, to a remote data receiving site. A data storage facility includes a first data store for recording each change in the data generated by the data altering apparatus. A register set records each change on a track-by-track basis. A second data store has first and second operating modes. During a first operating mode the second data store becomes a mirror of the first data store. During a second operating mode the second data store ceases to act as a mirror and becomes a source for a transfer of data to the data receiving site. Only information that has been altered, i.e., specific tracks that have been altered, is transferred during successive operations in the second operating mode.

U.S. Pat. No. 6,513,102 to Garrett, et al., whose disclosure is incorporated herein by reference, describes a system for transferring data from a first storage device, accessible to a first command processor, to a second storage device accessible to a second command processor but not necessarily to the first processor. In this case, the transfer is made internally by a storage controller rather than by requiring the command processors to communicate directly with each other.

U.S. Pat. No. 6,742,138 to Gagne, et al., whose disclosure is incorporated herein by reference, describes a data recovery program that restores data in a first storage device using data from a second storage device. The program also updates the first storage device with data supplied from a host.

U.S. Pat. No. 6,574,703 to Don, et al., whose disclosure is incorporated herein by reference, describes a method for initializing an extent on a mass storage device having at least one track. Initializing the extent comprises setting an initialization code indicating that the track is to be initialized. A subsequent read/write operation in a track of the extent causes the track to be rewritten with the initialization data.

U.S. Patent Publication 2003/0195864 to Vishlitzky, et al., whose disclosure is incorporated herein by reference, describes providing storage areas of a multiplicity of types that contain sections of data. Pointers are provided that are claimed to allow access or not to allow access to the data.

U.S. Pat. No. 6,839,827 to Beardsley, et al., whose disclosure is incorporated herein by reference, describes a method for mapping logical blocks to physical storage blocks. A storage controller defines the logical storage space as a sequence of logical chunks, wherein each logical chunk comprises a plurality of logical blocks in the logical storage space. The storage controller further defines a physical storage space as a sequence of physical chunks, wherein each physical chunk comprises a plurality of physical blocks in the physical storage system. The storage controller associates each logical chunk in the sequence of logical chunks defining the logical storage space with one physical chunk in the physical storage system. Further, contiguous logical chunks are capable of being associated with non-contiguous physical chunks.

U.S. Pat. No. 6,088,764 to Shyam, et al., whose disclosure is incorporated herein by reference, describes a method for reducing space allocation failures in a computer system that utilizes direct access storage devices to store data. The method comprises determining if authorization has been given to attempt to allocate an initial space request over more than one volume, and, if so, attempts to allocate space on a plurality of volumes. If the initial space request cannot be allocated on a plurality of volumes, the initial space request is reduced by a preset percentage, an extent limit is removed and an attempt is made to allocate the reduced space request on the plurality of volumes.

U.S. Pat. No. 5,897,661 to Baranovsky, et al., whose disclosure is incorporated herein by reference, describes an apparatus providing a logical unit of undivided data storage that spans physical storage device boundaries. The apparatus manages the logical unit of undivided storage using metadata information stored on the physical storage devices. The apparatus replicates a minimum portion of the metadata information across all of the data storage devices and typically writes metadata only in the devices where the information is required to operate. In a preferred embodiment, a logical unit of undivided storage is created by defining a logical volume and allocating portions of available physical data storage devices thereto in order to provide a minimum logical volume size. Metadata is generated and stored on the data storage devices to provide detailed information about the portions of each data storage device that have been allocated to the logical volume.

U.S. Patent Application Publications 2005/0076262, 2005/0076261, 2005/0066222, 2005/0065962, and 2005/0063374 to Rowan, et al., whose disclosures are incorporated herein by reference, describe "a method, apparatus, and system for accessing units of storage that depends at least in part on an address of the unit of storage and the time that data was written to the unit of storage." A data store is provided that identifies the location of data at a requested address in response to a time specification and a data request. In one embodiment, "the location is chosen from a time store associated with a data store and a current store associated with the data store, or some combination. The identifying step can include determining whether the data at the requested address at the specified time was changed after the specified time. If data at the requested address was changed after the specified time, the identified location is the time store. If the data was not changed, the identified location is the current store."

SUMMARY OF THE INVENTION

Embodiments of the present invention provide efficient methods and apparatus for managing snapshots in a data processing system.

In embodiments of the present invention, a data storage system receives, typically from a host computer, a first write command to store data identified by a logical address of a first logical volume. The storage system stores the data at a first physical location, which the storage system associates with a partition of the first logical volume. Meta-data, comprising configuration records and a first partition descriptor record (PDR) facilitate the association between the first physical location and the partition. The storage system may subsequently receive a management command to create a snapshot of the first logical volume. The snapshot is created by simply incrementing a global counter associated with the first logical volume. Thus the snapshot is essentially created instantaneously. After the snapshot is created, a second write command may be received to store new data at the partition. The new data is stored at a second physical location associated with the partition by means of a second PDR. The data at the first physical location remains unchanged and may be accessed in response to a read command that requests data from the first snapshot. Access to the data at the first physical location is implemented using the first PDR. Association of the data with the first snapshot is confirmed by testing a snapshot indicator associated with the first PDR.

Implementation of the second write command also comprises linking the second PDR by a pointer to the first PDR. When a subsequent read command is issued to read data associated with a given snapshot, the storage system first accesses the PDR that was created most recently. If the snapshot indicator of the most recent PDR is more recent than the snapshot requested, the links between PDRs are followed until a PDR is identified that comprises a snapshot indicator equal or earlier to that given by the read command. The read command is then implemented by reading the data addressed by the identified PDR.

A copy command copies a prior status of a first logical volume, as defined by a snapshot number given in the command, to a second logical volume. Hereinbelow, the first logical volume is referred to as the source volume, and the second volume is referred to as the target volume. To implement the command, the storage system first generates a configuration record defining the target logical volume. Then, for each partition of the source volume, the storage system follows links between PDRs, as described above, until the PDR associated with the snapshot is identified. The PDR is copied and associated with the target logical volume, while the data addressed by the PDR remains in the same location. In this manner, a logical volume copy may be made without copying physical data. The target volume reflects the status of the source volume at the given snapshot time.

In an alternative embodiment of the present invention, a global snapshot time is used instead of a global counter to track snapshots of the logical volume. In such embodiments, the snapshot indicator comprised in PDRs is indicative of time rather than being a discrete integer.

There is therefore provided, in accordance with an embodiment of the present invention, a method for creating logical volume snapshots in a data storage system, including:

responsively to a first write command to write first data to a partition of a logical volume, generating a first partition descriptor record (PDR) and storing the first data at a first physical location associated with the first PDR;

subsequent to the first write command, receiving a snapshot command to form a snapshot of the logical volume;

subsequent to the snapshot command and responsively to a second write command to write second data to the partition of the logical volume, generating a second PDR and storing the second data at a second physical location associated with the second PDR, and generating a pointer between the first PDR and the second PDR; and subsequent to the second write command and responsively to a read command indicating a number of a desired snapshot of the logical volume, accessing the first PDR using the pointer.

In an embodiment, the snapshot command includes receiving the command at a specific time and setting a global counter equal to the specific time.

In an embodiment, receiving the snapshot command includes incrementing a global counter.

In an embodiment, generating the first PDR includes generating a snapshot indicator of the first PDR.

For some applications, accessing the first PDR includes comparing the snapshot indicator of the first PDR with the number of the desired snapshot.

In an embodiment, generating the first PDR includes associating the partition of the logical volume with the first PDR. Typically, generating the second PDR includes disassociating the partition from the first PDR and associating the partition with the second PDR. In this case, associating the partition with the first PDR may include generating a further pointer to the first PDR in a partition hash table.

In some applications, generating the pointer between the first PDR and the second PDR includes generating a binary tree of a series of PDRs. In this case, the binary tree may be generated by an Adelson-Velskii and Landis (AVL) method.

In an embodiment, the logical volume includes a source logical volume, the partition includes a first partition. Typically, the method includes, responsively to a volume copy command to copy the source logical volume to a target logical volume:

generating a third PDR associated with the first physical location; and associating the third PDR with the target logical volume.

There is further provided, in accordance with an embodiment of the present invention, apparatus for creating snapshots in a data storage system, including:

a control unit which is adapted:

to generate a first partition descriptor record (PDR) responsively to a first write command to write first data to a partition of a logical volume, to store the first data at a first physical location associated with the first PDR, to receive a snapshot command to form a snapshot of the logical volume, to generate a second PDR responsively to a second write command to write second data to the partition of the logical volume, to store the second data at a second physical location associated with the second PDR, to generate a pointer between the first PDR and the second PDR, and to access the first PDR using the pointer, responsively to a read command indicating a number of a desired snapshot of the logical volume.

In an embodiment, the control unit is adapted to receive the snapshot command at a specific time and to set a global counter equal to the specific time.

In an embodiment, the control unit is adapted to increment a global counter.

In an embodiment, the control unit is adapted to generate a snapshot indicator of the first PDR.

For some applications, the control unit is adapted to compare the snapshot indicator of the first PDR with the number of the desired snapshot.

In an embodiment, the control unit is adapted to associate the partition of the logical volume with the first PDR. The control unit may also be adapted to disassociate the partition from the first PDR and to associate the partition with the second PDR. The control unit also may be adapted to generate a further pointer to the first PDR in a partition hash table.

In an embodiment, the control unit is adapted to generate a binary tree of a series of PDRs. The control unit may be adapted to generate the binary tree by an Adelson-Velskii and Landis (AVL) method.

For some applications, the logical volume includes a source logical volume and the partition includes a first partition. The control unit may be further adapted, responsively to a volume copy command, to generate a third PDR associated with the first physical location, and to associate the third PDR with the target logical volume.

The present invention will be more fully understood from the following detailed description of the embodiments thereof, taken together with the drawings in which:

DETAILED DESCRIPTION OF EMBODIMENTS

Figure 1:
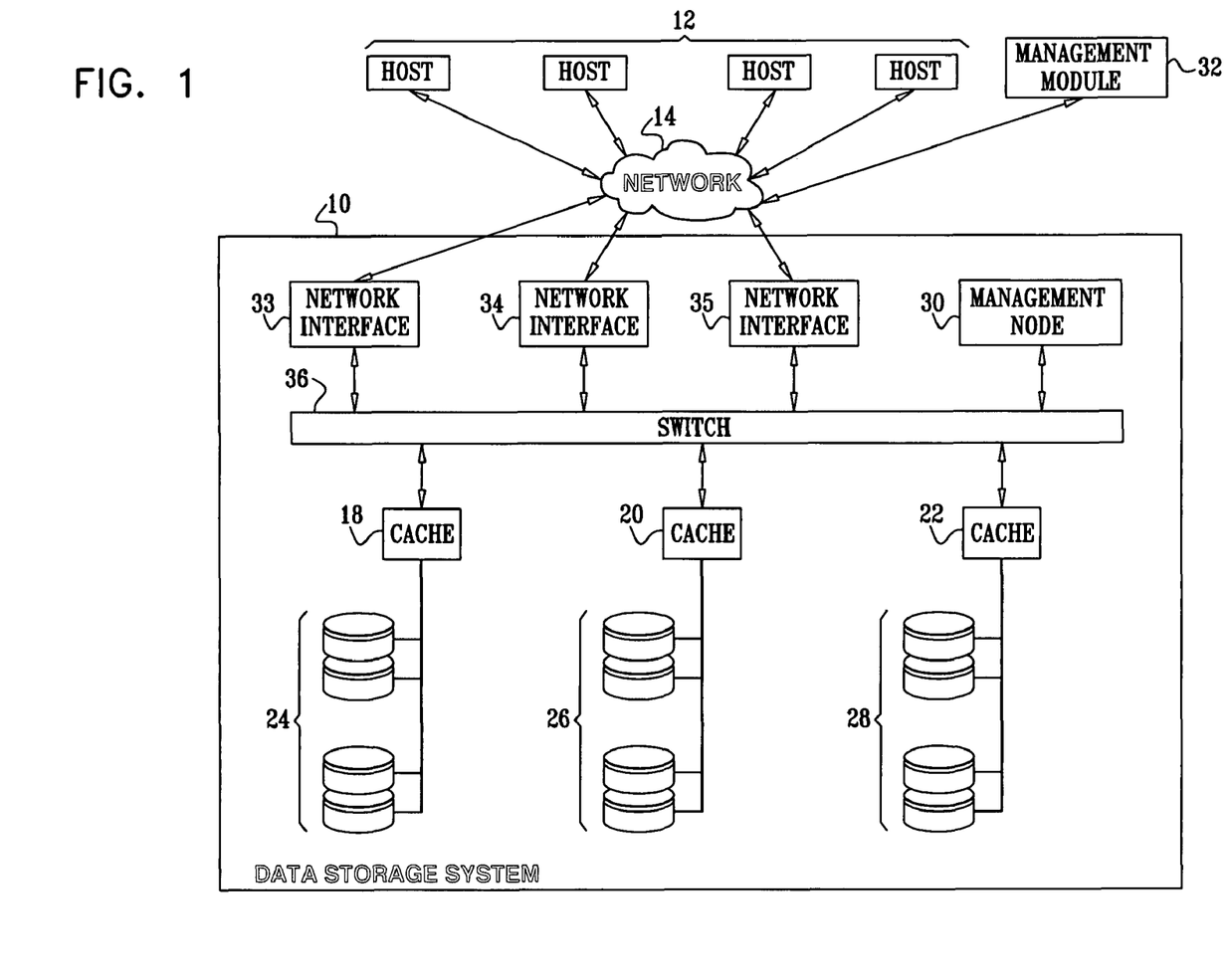
FIG. 1 is a schematic diagram of a data storage system, in accordance with an embodiment of the present invention.

Reference is now made to FIG. 1, which schematically illustrates a storage system 10, in accordance with an embodiment of the present invention. Storage system 10 receives, from one or more host computers 12, input/output (I/O) commands, comprising commands to read or write data at logical addresses on logical volumes. Host computers 12 are coupled to storage system 10 by any means known in the art, for example, via a network or by a bus. Herein, by way of example, host computers 12 and storage system 10 are assumed to be coupled by a network 14.

The logical addresses specify a range of data blocks within a logical volume, each block herein being assumed by way of example to contain 512 bytes. For example, a 10 KB data record used in a data processing application on a host computer would require 20 blocks, which the host computer might specify as being stored at a logical address comprising blocks 1000 through 1019 of a logical volume V1.

Storage system 10 typically operates in, or as, a network attached storage (NAS) or a storage area network (SAN) system. However, it will be understood that the scope of the present invention is not limited to storage systems operating in any particular configuration. Rather, the scope of the present invention includes systems operating in any suitable configuration used for storing data.

I/O commands to read data comprise at least two fields, a first field specifying the command type (i.e., read), and a second field specifying the logical address, which includes the logical volume. I/O commands to write data comprise at least three fields, a first field specifying the command type (i.e., write), a second field specifying the logical address, and a third field specifying the data that is to be written. In embodiments of the present invention, read commands may include an additional field comprising a snapshot number, as described further hereinbelow.

Storage system 10 comprises one or more caches, exemplified in FIG. 1 by three caches 18, 20, and 22. However, it will be appreciated that the number of caches used in system 10 may be any convenient number, and may comprise a central cache for the system. Caches 18, 20, and 22 are distinguished from each other to facilitate the exposition of cache operation hereinbelow. All caches in system 10 are assumed to operate in substantially the same manner and to comprise substantially similar elements. Elements in the caches of the system, and operations of the caches, are described in more detail below with respect to FIG. 2.

Each of the caches is assumed to be approximately equal in size and is also assumed to be coupled, by way of example, in a one-to-one correspondence with a set of physical storage.

Those skilled in the art will be able to adapt the description herein, mutatis mutandis, to differently-sized caches and to caches and storage devices in other correspondences, such as the many-to-many correspondence described in US Patent Publication 2005/0015566, titled "Data Allocation in a Distributed Storage System," which is assigned to the assignee of the present invention and which is incorporated herein by reference. Each set of physical storage comprises multiple slow and/or fast access time mass storage devices, hereinbelow assumed to be multiple hard disks. By way of example, FIG. 1 shows caches 18, 20, and 22 coupled to respective sets of physical storage 24, 26, and 28. In response to an I/O command, each cache performs as a disk controller, reading or writing data at addressable physical locations of the physical storage coupled to the cache. In an alternative embodiment of the present invention, caches may be coupled in a one-to-one correspondence with disk controllers that are configured as separate entities and which are, in turn, directly coupled in a one-to-one correspondence to the set of physical storage.

A single addressable physical location, also referred to herein as a track, typically contains 128 data blocks.

In some embodiments of the present invention, a management node 30 of storage system 10 receives, from a management module 32, a formation command to form a logical volume V1. The management module may be operated from a dedicated external computing system or from one or more of the host computers. The purpose of the formation command is to permit host computers 12 to specify logical addresses of V1 in subsequent I/O commands.

In response to the formation command, management node 30 creates routing records which indicate how the logical addresses of V1 are to be distributed across caches 18, 20, and 22. In an embodiment of the present invention, the routing of logical addresses is implemented according to methods described in the above-referenced US Patent Publication 2005/0015566. According to the aforementioned methods, management node 30 assigns logical addresses to groups, herein referred to as partitions. Each partition may comprise a set of logical addresses equal in size to a track. Management node 30 determines the allocation of partitions among the one or more caches to provide an approximately equal number of partitions on each cache. The allocation is such that when data blocks of a logical volume are written to storage system 10, the blocks will be distributed in a balanced manner across all caches. Furthermore, the association of partitions with caches may be done in such a manner that the partitions of one logical volume associated with a specific cache, such as cache 18, may have the same identifying names, or numbers, as the partitions of additional logical volumes that are also associated with cache 18. That is, if a partition identified as P1 and comprising logical addresses of logical volume V1 is stored on cache 18, then partitions of additional volumes V2 and V3 with the identification of P1 may also be stored on cache 18.

The routing records, indicating the association of logical addresses of logical volumes with partitions and the association of the partitions with caches, are distributed by the management node to one or more generally similar network interfaces of storage system 10. The network interfaces are indicated in FIG. 1 as three network interfaces 33, 34, and 35, but it will be understood that system 10 may comprise any convenient number of network interfaces.

Referring back to the formation command to form volume V1, management node 30 also distributes messages to caches 18, 20, and 22 instructing the caches to form volume V1.

Subsequent to the formation of V1, network interfaces 33, 34, and 35 receive I/O commands from host computers 12 specifying logical addresses of V1. The network interfaces use the routing records to break the commands into I/O commands, or command subsets, which are then distributed among caches 18, 20, and 22. By way of example, network interface 33 may receive a command to read data at a logical address comprising blocks 1000 through 1019 of logical volume V1. Network interface 33 uses the routing records to convert the logical address (which comprises 20 blocks) to partition addresses, such as a first partition address comprising blocks 125 through 128 on a partition P5 of cache 18, and a second partition address comprising blocks 1 through 16 on a partition P6 of cache 20.

Having determined the partition addresses associated with caches 18 and 20, network interface 33 then sends I/O commands specifying the partition addresses to the respective caches 18 and 20. Each cache, upon receiving the respective command, then determines a physical location, i.e., a track, associated with the specified partition. Thus, following the example described above, cache 18 identifies the track associated with its partition P5, and cache 20 identifies the track associated with its partition P6. Each cache will then read data from the indicated track according to processes described further hereinbelow.

Routing of commands from network interfaces 33, 34, and 35 to each cache is typically performed over a network and/or a switch. Herein, by way of example, the network interfaces are assumed to be coupled to the caches by a switch 36.

In further embodiments of the present invention, a management node 30 of storage system 10 may receive from a management module 32 a snapshot command to create a snapshot of a logical volume, as described further hereinbelow.

Figure 2:
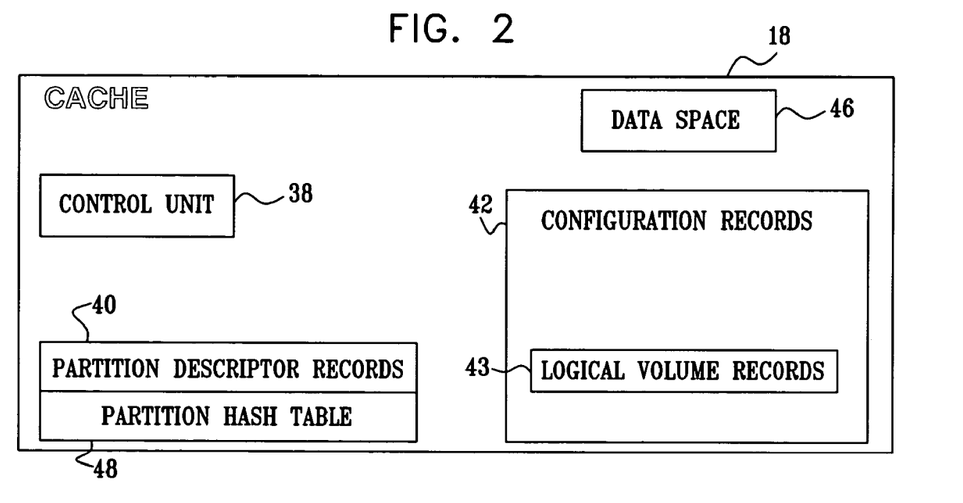
FIG. 2 is a schematic diagram of a cache in the data storage system of FIG. 1, in accordance with an embodiment of the present invention.

FIG. 2 is a schematic diagram of elements of cache 18 of FIG. 1, in accordance with an embodiment of the present invention. A control unit 38 performs the processing and communications functions of the cache. Control unit 38 also performs the tasks of reading and writing data to physical storage 24. The control unit determines tracks of the physical storage at which to read and write data, performing this determination by using partition descriptor records (PDRs) 40, and by using configuration records 42. The PDRs of cache 18 associate the partitions allocated to cache 18 with tracks of physical storage 24. Configuration records 42 comprise logical volume records 43, which define respective logical volume properties. Configuration records 42 may also comprise additional records such as those used to support methods of instant copying described in the U.S. patent application Ser. No. 11/123,993, titled "Data Storage Methods for Hierarchical Copies," filed May 6, 2005, which is incorporated herein by reference, and which is attached as Appendix A.

Cache 18 also comprises a data space 46, wherein data may be manipulated or temporarily stored during an I/O process. Cache 18 further comprises a partition hash table 48 used by control unit 38 to access PDRs.

Figure 3A:
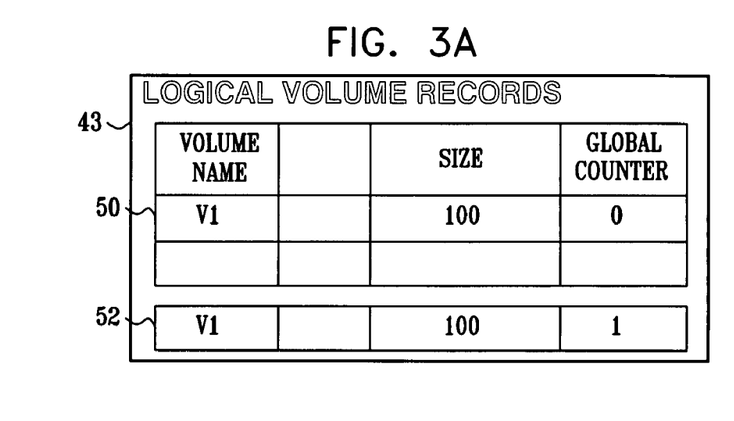
FIGS. 3A and 3B show sets of meta-data in the cache of FIG. 2, in accordance with an embodiment of the present invention.

FIG. 3A shows two states of a logical volume record for a logical volume V1 that may be comprised in logical volumes 43 of cache 18 at two respective periods of time, in accordance with an embodiment of the present invention. Record 50 of FIG. 3A shows a state of logical volume V1 before any snapshots of V1 have been created. As indicated in the figure, the logical volume record comprises three fields, these being a volume name field 54, a size field 56 (typically measured in thousands of partitions), and a field 58 having a global counter. The global counter tracks the number of snapshots created from the logical volume. By way of example, logical volume V1 is shown to have a size of 100K partitions and to have an initial global counter state of 0.

Logical volume records are created and modified in response to management commands that control unit 38 receives from management node 30. Management commands comprise commands to form logical volumes, to copy logical volumes, and to create snapshots of logical volumes.

Figure 4:
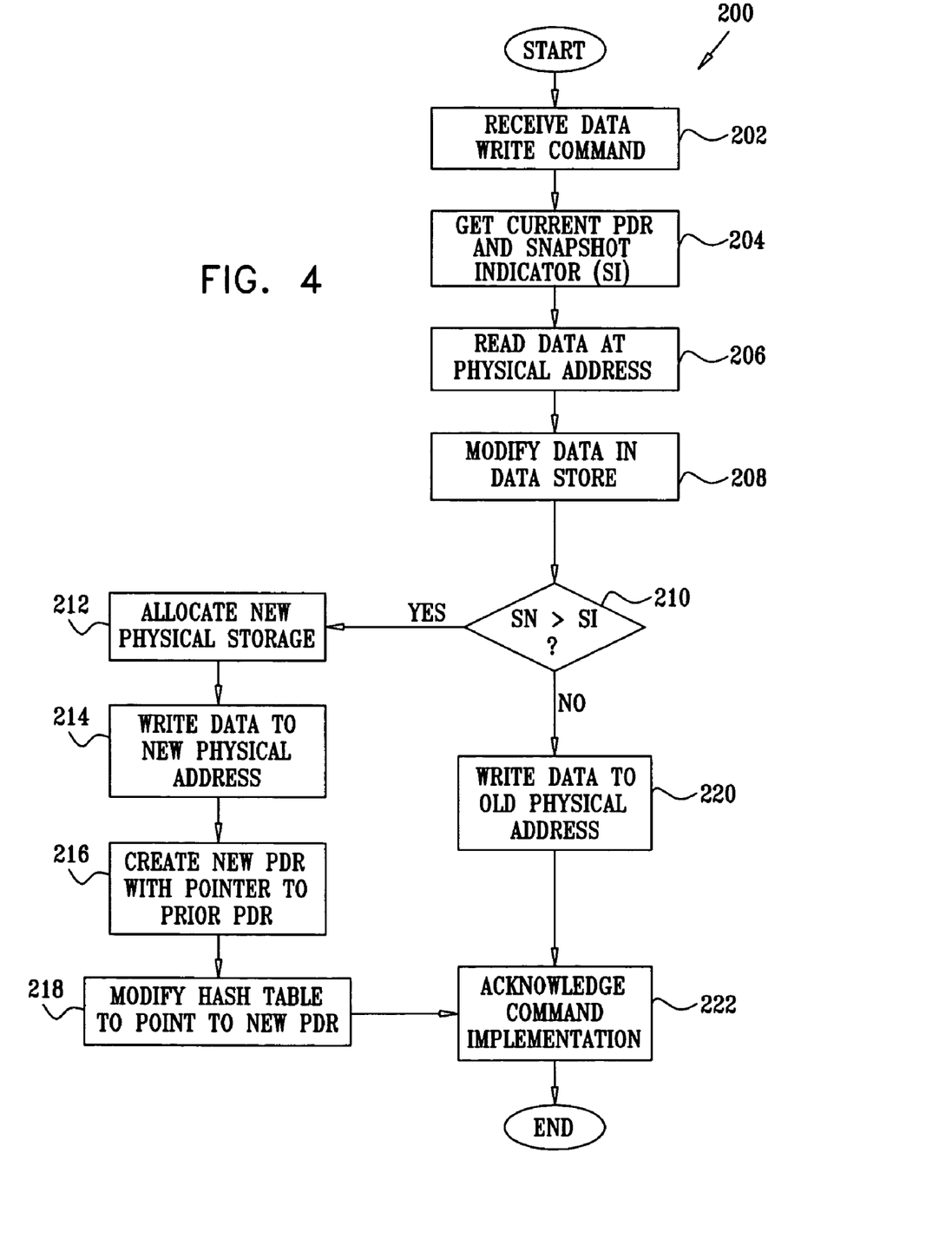
FIG. 4 is a flowchart of a process implemented when a write command is received by the data storage system of FIG. 1, in accordance with an embodiment of the present invention.
Figure 5:
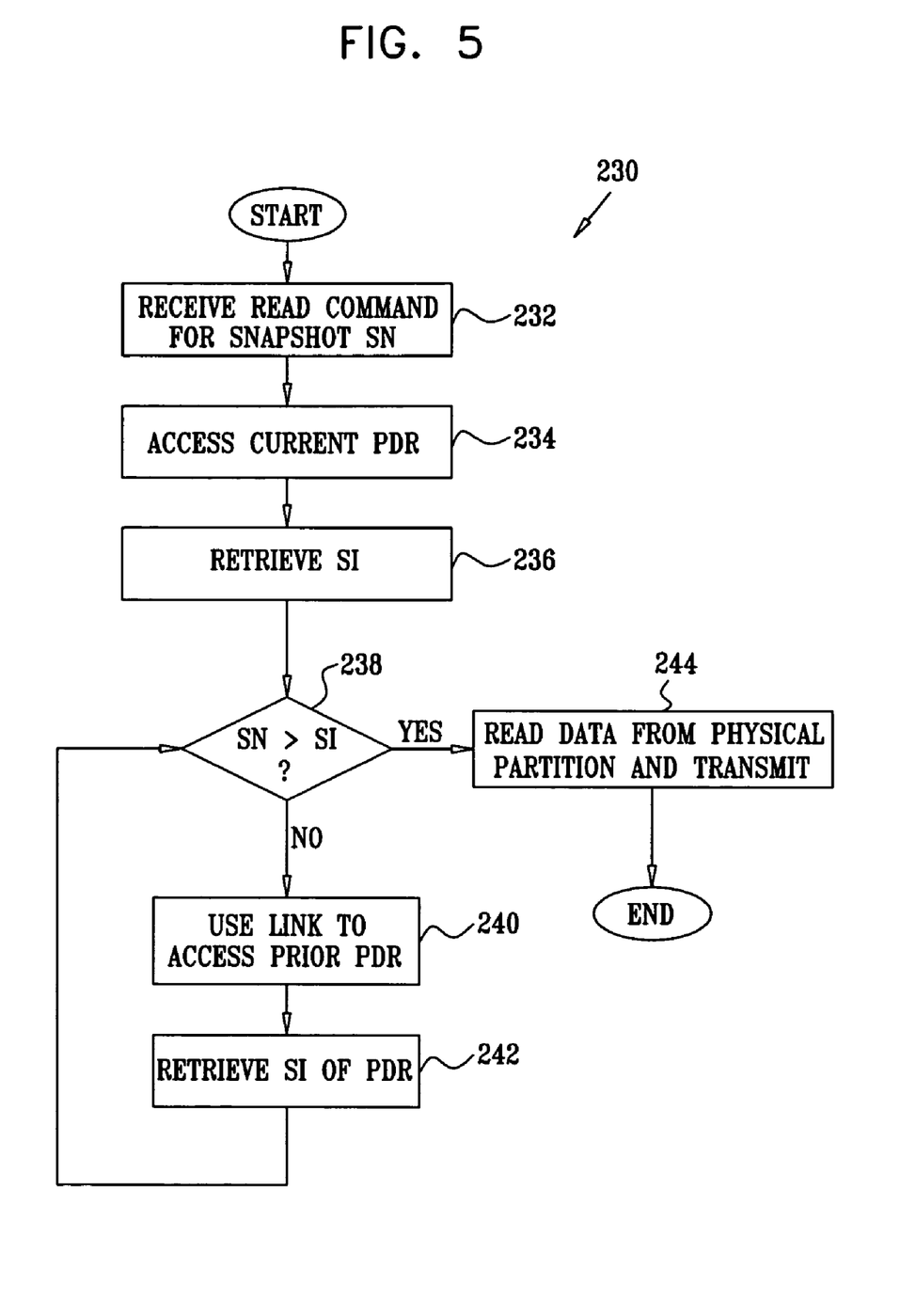
FIG. 5 is a flowchart of a process implemented when a read command specifying a prior snapshot is received by the data storage system of FIG. 1, in accordance with an embodiment of the present invention.

When a management command to create a snapshot of a logical volume is received by cache 18, the global counter of the logical volume is incremented. For example, when a snapshot command to create a first snapshot of V1 is received, the global counter may be incremented to 1, as indicated by record 52 of FIG. 3A. No other processing is performed by cache 18 to implement the snapshot command, and thus the command is performed essentially instantaneously. Subsequent to receiving the snapshot command, the cache will ensure that all partition data current at the time of the snapshot is preserved, according to processes described hereinbelow (FIGS. 4 and 5).

Figure 3B:
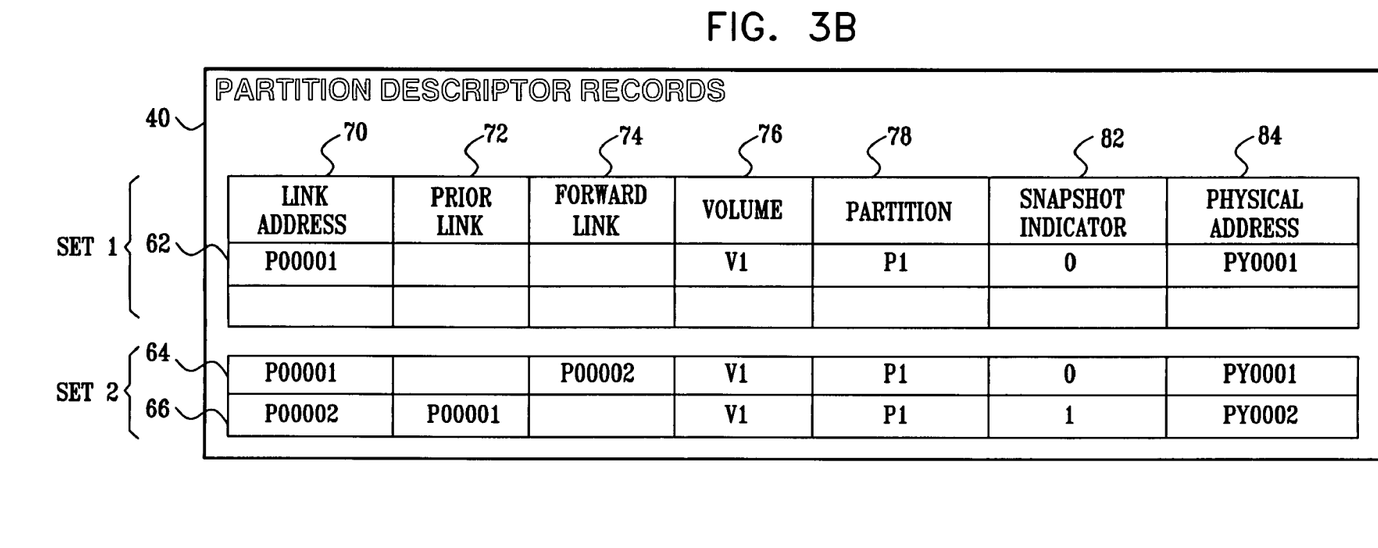

FIG. 3B shows two sets of PDRs 40 that may exist in cache 18 at two respective periods of time, in accordance with an embodiment of the present invention. During typical operation, caches may maintain several hundred thousand PDRs or more. Each PDR identifies a physical address associated with a particular partition. The physical address is identified by a physical address field 84. Typically the PDR also comprises fields 78 and 76, respectively indicating the partition and logical volume associated with the PDR. In an embodiment of the present invention, the PDR also comprises a link address field 70, a prior link field 72, a forward link field 74, and a snapshot indicator field 82.

A snapshot indicator (SI) in field 82 associates the given PDR with a snapshot, thereby enabling PDRs of a given snapshot to be retrieved from storage system 10. When a new PDR is created, it is created with a snapshot indicator equal to the current global counter of the respective logical volume. By way of example, before any snapshots have been created for logical volume V1, a PDR for partition P1 of V1 may appear as shown by a record 62 in Set 1 of FIG. 3B. The PDR of record 62 addresses physical address PY0001, as indicated by field 84. The volume name, V1, and the partition name, P1, are indicated respectively by fields 76 and 78. Snapshot indicator field 82 is set to 0, which is the corresponding value of the global counter of V1 before any snapshots of V1 have been created. As write commands to partition P1 are received by cache 18, the data comprised in these commands are stored at PY0001, overwriting previous data.

When a first snapshot command is received by cache 18, the global counter of V1 is incremented to 1, as shown in FIG. 3A. As described above, no further processing is performed when the snapshot command is received, and thus the execution is essentially instantaneous. Following execution of the first snapshot command, subsequent read commands may be received by cache 18 to access the data of V1 that existed immediately prior to the execution of the snapshot command. This prior data is collectively referred to as snapshot number 1, in that the snapshot was the first snapshot performed. Subsequent snapshot commands create data sets collectively referred to as snapshot number 2, snapshot number 3, etc.

After the first snapshot command, the next subsequent write command to P1 causes a new physical location to be allocated for the data comprised in the command. A new PDR is created addressing the new physical location and comprising the fields shown in record 66 of Set 2. As indicated by field 84 of record 66, the new physical location has address PY0002. As indicated by field 82, the snapshot indicator of the new PDR is 1, corresponding to the current global counter. The earlier data of P1 at the time of snapshot number 1 remains unchanged at physical address PY0001. Thus, this data may be accessed in response to subsequent read commands that specify the data of snapshot number 1.

The PDR of record 62 is modified to become a record 64 of Set 2. Fields 70, 72, and 74 are used to chain the PDRs together, field 70 acting as an identifier of a given PDR, prior link field 72 pointing to the identifier of the PDR created directly before the given PDR, and forward link field 74 pointing to the identifier of the PDR created directly after the given PDR. Thus, record 64 is shown to have a link address of P00001 and has a forward link to record 66, which has a link address of P00002. Conversely, record 66 has a prior link to P00001.

Fields 70, 72, and 74 are described further in relation to process 200 (FIG. 4).

FIG. 4 is a flowchart of a process 200 implemented when a write command is issued to update partition P1 of logical volume V1 with new data, in accordance with an embodiment of the present invention. At an initial step 202, control unit 38 of cache 18 receives a data write command from one of network interfaces 33, 34, and 35. For the sake of illustration, the command is assumed to be derived from a write command specifying data that is to be written to blocks 100 through 110 of partition P1. Before the command is received, PDRs 40 are assumed to comprise PDR of record 62 of Set 1 (FIG. 3B).

To implement the write command, control unit 38 first accesses at a step 204 a PDR associated with data most recently written to partition P1. This PDR is herein termed the current PDR, and is accessed by a pointer in partition hash table 48 (FIG. 2). The current PDR is used at a step 206 to identify the physical address of the data present in partition P1, and to read that data into data space 46. At a step 208, the data in data space 46 is modified according to the write command, i.e., blocks 100 through 110 of the partition are modified.

After the data is modified, the decision as to where to write the modified data is made in a decision step 210. The snapshot indicator, SI, of the current PDR is compared with the global counter, GC, of V1. If GC is greater than SI, then GC has been incremented by at least one snapshot command since the last time data was written to P1. For example, if GC=2 and SI=1, then the data addressed by the current PDR represents the status of the data of P1 at the time of snapshot 1, this being the snapshot which caused GC to be incremented to 2. Thus, the data addressed by the current PDR must be saved to preserve snapshot number 1. The "yes" path from decision step 210 is followed to a step 212, at which a new physical storage location is allocated for the modified data. At a subsequent step 214, the modified data is written to the newly allocated storage location. Next, at a step 216, a new PDR is created to address the new storage location. Link pointers are modified in both the current PDR, which becomes a prior PDR, and in the new PDR (fields 70, 72, and 74 of records 64 and 66 of FIG. 3B), thereby chaining the two PDRs together. The linkage of PDRs is described further in relation to process 230 (FIG. 5).

At a step 218, the partition hash table is set to point to the new PDR, which thereby becomes the current PDR for subsequent write commands. Following step 218, the completion of the command is acknowledged at a step 222 and the process ends.

Alternatively, at decision step 210, the snapshot indicator and the global counter may be found to be equal. In this case, the current PDR points to data that already has been modified after the last snapshot command. Consequently, this data does not need to be preserved for a snapshot. The "no" path from step 210 is therefore followed to a step 220, at which the modified data is simply written back to the physical address indicated by the current PDR. Following step 220, the completion of the command is acknowledged at a step 222 and the process ends.

It may thus be understood that in order to make data associated with a snapshot of a volume V5 available for subsequent access, cache 18 does not write over data associated with a snapshot, but instead stores a subsequent update of data in a partition at a new physical address. A new PDR is created, linking the physical address with the partition. The prior data remains at the original physical address, which is pointed to by the original PDR. Also, the original PDR is updated so that it and the new PDR are linked.

It may likewise be understood that the amount of metadata necessary for implementing snapshots is directly proportional to the number of partitions subsequently modified and is relatively small in comparison with the amount of data stored in the logical volume. Consequently, the embodiment is efficiently scalable, in that the size of a logical volume may be increased with only a proportional increase in the amount of metadata needed to manage the logical volume.

FIG. 5 is a flowchart of a process 230 implemented when a data read command is received by cache 18, in accordance with an embodiment of the present invention. At an initial step 232, control unit 38 of cache 18 receives a read command from one of network interfaces 33, 34, and 35, the command typically being generated in response to a read command from one of host computers 12. By way of example, the command is assumed to be received from network interface 33. The command is further assumed to be a request to read data at blocks 100 through 110 of partition P1 of logical volume V1.

The read command comprises a snapshot number, SN, indicating the desired prior snapshot of data to be accessed. To implement the read command, control unit 38 first uses the partition hash table to access, at a PDR access step 234, the current PDR associated with P1. At a step 236, a snapshot indicator, SI, of the current PDR is read and, at a subsequent decision step 238, SI is compared with the snapshot number SN.

If SI is greater or equal to SN, meaning SI is more recent than the snapshot, then the current PDR contains changes made subsequent to the time of the snapshot. Conversely, if SI is not greater, but rather less than SN, then no changes have occurred in partition P1 since the time of the snapshot. In the latter case, because no changes have occurred, the data at the physical address indicated by the current PDR satisfies the read command. The "yes" branch of step 238 is therefore followed to a step 244, at which the data indicated by the identified PDR is read and transmitted. If changes have occurred, then prior data is sought by the read command. In this case, the "no" branch of step 238 is followed to a PDR access step 240, comparable to step 234. It may be understood that the difference between step 234 and step 240 is that the current PDR is accessed at step 234 through the partition hash table, whereas a prior PDR is accessed at step 240 through the prior link field 72 of the current PDR.

Following step 240, the SI of the prior PDR is accessed at a step 242. The loop of steps 238-242 is then reiterated until a PDR with SI less than or equal to SN is identified. At this point, the "yes" branch of step 228 is followed to step 244, described above, after which the process ends.

Figure 6:
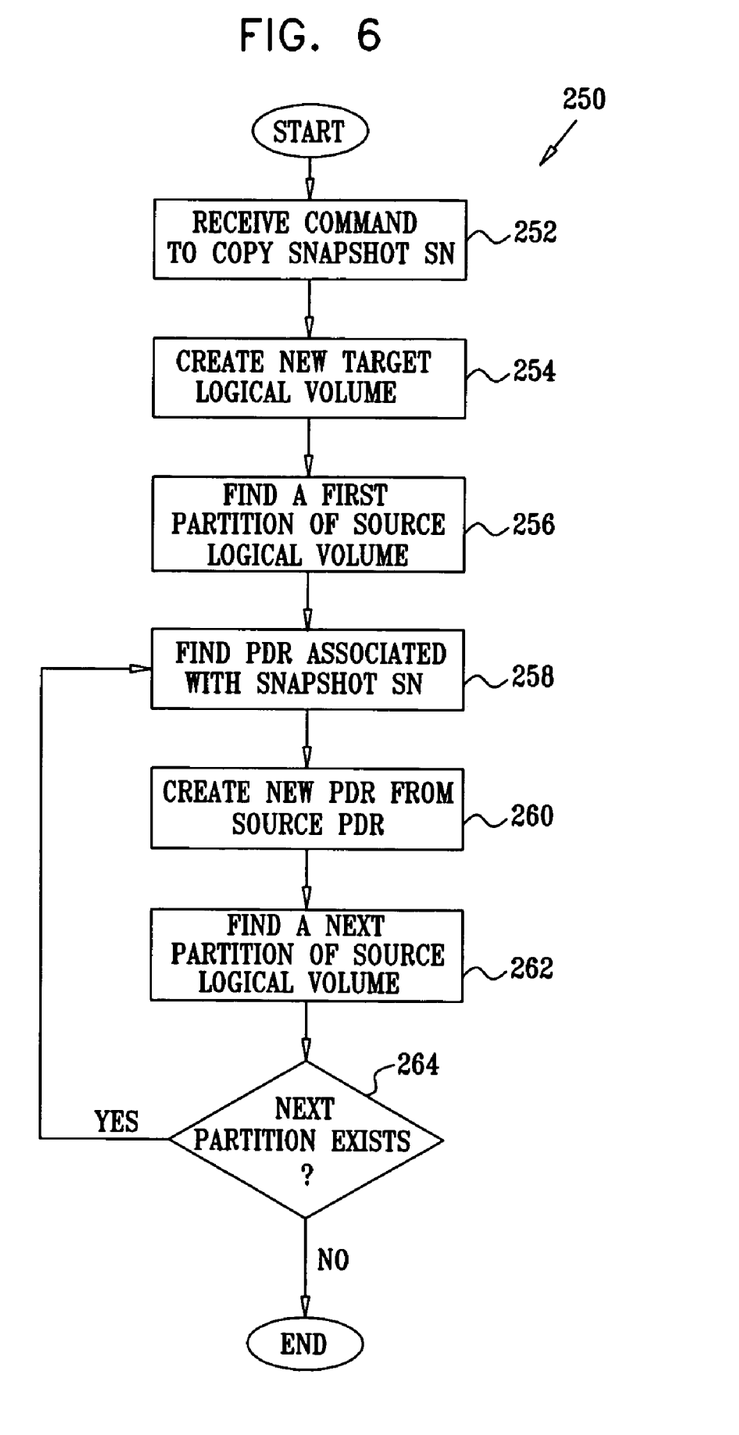
FIG. 6 is a flowchart of a process implemented when a volume copy command is received by the data storage system of FIG. 1, in accordance with an embodiment of the present invention.

FIG. 6 is a flowchart of a process 250 implemented when a volume copy command to copy logical volume V1 to a logical volume V2 is received by cache 18, in accordance with an embodiment of the present invention. At an initial step 252, control unit 38 of cache 18 receives a volume copy command comprising a snapshot number SN from one of network interfaces 33, 34, and 35. The command effects copying, at the time of the snapshot, the status of logical volume V1, the source logical volume, to logical volume V2, the target logical volume.

Upon receiving the copy command, the control unit generates, at a step 254, a logical volume record defining V2, as described above with reference to FIG. 2. Subsequently, at a step 256, the control unit locates a first partition of logical volume V1, which, by way of example, may be P1. At a step 258, a P1 PDR corresponding to snapshot SN is located, by an iterative process substantially similar to that described in reference to process 230 above, using steps 238, 240, and 242.

Once the PDR is located, the physical address associated with the PDR is associated with a new P1 PDR created for the target logical volume. Both the source and the target thus comprise a partition P1 pointing to the same physical address. At a subsequent step 262, the next partition of logical volume V1 is accessed, and if such a partition exists, then at a decision step 264, the "yes" branch is followed to step 258, so that steps 258-264 are iterated until all partitions of V1 have been accessed, at which point process 250 ends.

It will be appreciated that in process 250 the implementation of the copy command does not copy physical data and may thus be considered to be analogous to a form of instant copy, such as is described in more detail in the abovementioned U.S. patent application Ser. No. 11/123,993. The target volume generated by process 250 comprises all partitions of the source volume as of the given snapshot, based on the snapshot indicators of each partition of the source volume.

Figure 7:
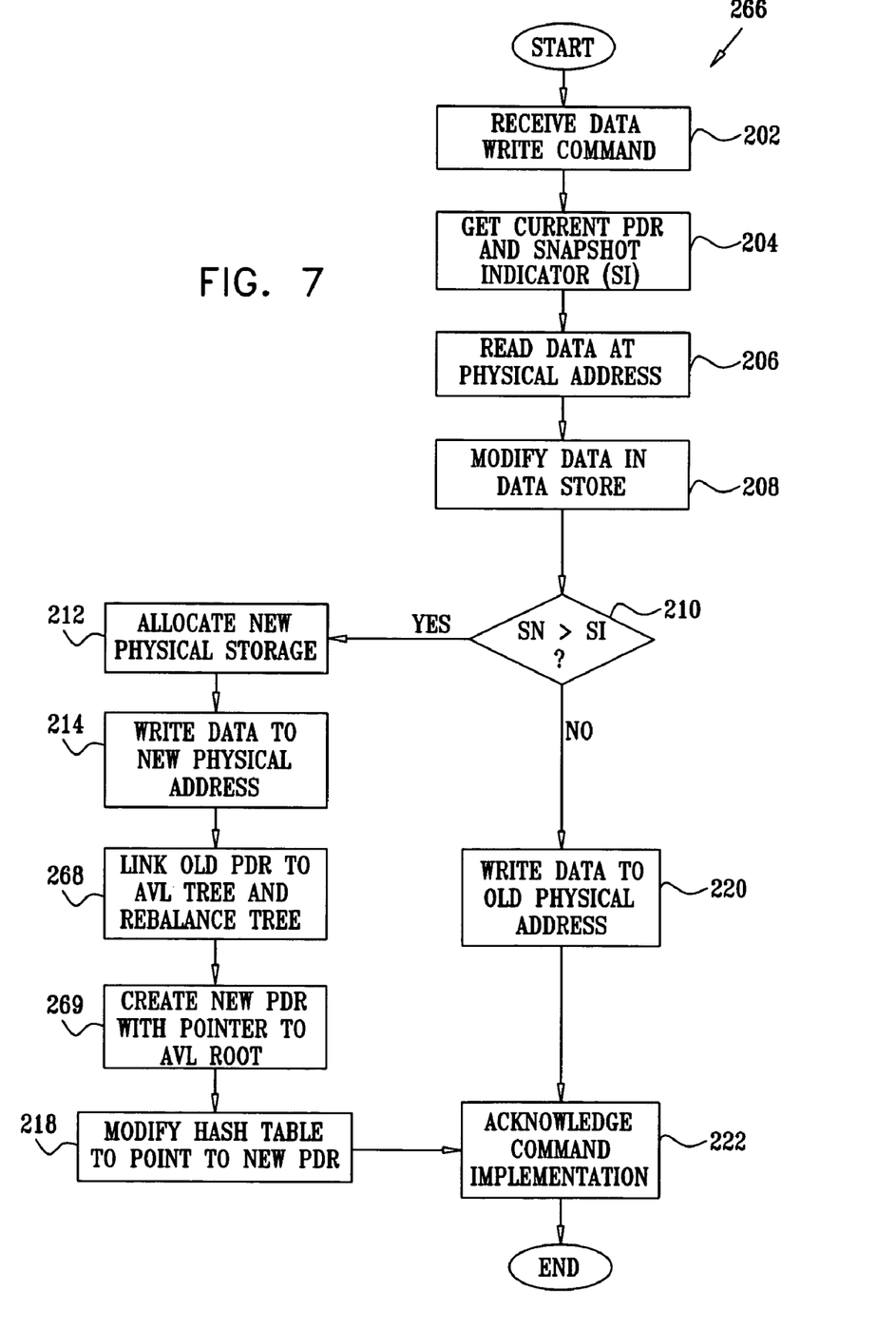
FIG. 7 is a flowchart of a process implemented when a write command is received by the data storage system of FIG. 1, in accordance with an alternative embodiment of the present invention.

FIG. 7 is a flowchart of a process 266 implemented when a write command is received by cache 18, wherein partitions are linked by a balanced binary tree, in accordance with an embodiment of the present invention. Except as described below, process 266 is substantially the same as process 200 (FIG. 4). Process 200 described a simple, linked list structure for managing the successive instances of PDR snapshots associated with a partition. Alternative mechanisms may be used for managing the structure of linked partitions. For example, balanced binary trees provide efficient structures for searching for a prior PDR, since balanced trees have insert and search times on the order of log n, n being the number of tree nodes in the structure. In an implementation of the present invention, the nodes of a binary tree comprise prior PDRs. Each node comprises two branches, a left branch pointing to a PDR with an earlier timestamp and a right branch pointing to a PDR with later timestamp. A balanced binary tree structure may be achieved using methods well known in the art, such as the method of Adelson-Velskii and Landis (AVL), wherein a process of rebalancing the tree is implemented each time a new node is added to the tree. Use of balanced binary trees to link PDRs is described, as well, in the U.S. patent application Ser. No. 11/196,721 titled "Continuous Data Protection," filed Aug. 3, 2005, which is incorporated herein by reference.

When storage system 10 is configured to implement PDR linking using balanced binary trees, link fields of PDRs are manipulated in order to create a tree, rather than a simple linked list. Other than this manipulation, the process of writing new data follows the steps of process 200 (FIG. 4). Only two steps of process 200 are changed to implement process 266. As indicated in FIG. 7, a step 268 is inserted after step 214. At step 268 a new PDR is not automatically linked to the prior PDR, but rather, the prior PDR is added to a balanced binary tree comprising all prior PDRs. The tree is then rebalanced. Next, at a step 269, the new PDR is linked to the root node of the tree. Processing of the write command then proceeds according to process 200 at a step 218.

Figure 8A:
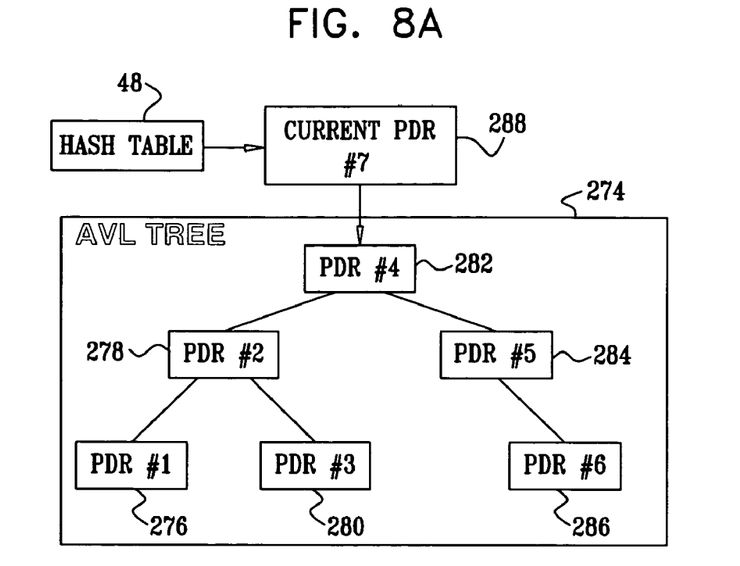
FIG. 8A and FIG. 8B are exemplary diagrams of the links between PDRs in a balanced binary tree, in accordance with an embodiment of the present invention.
Figure 8B:
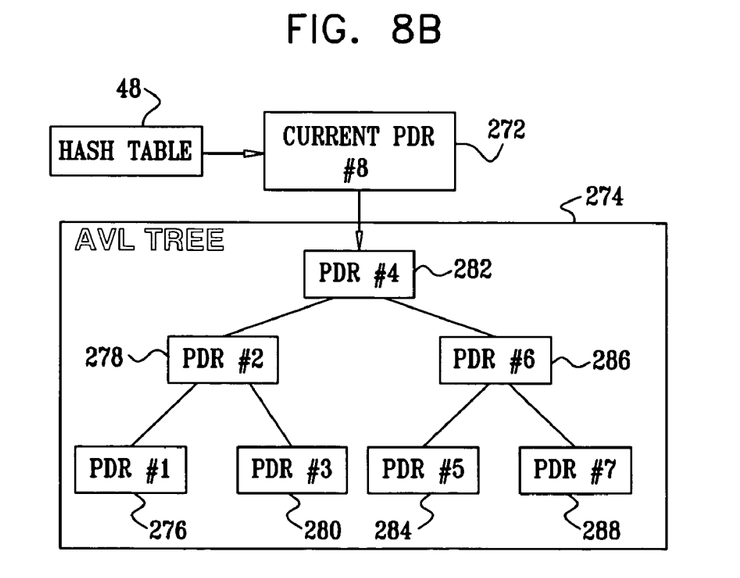

FIG. 8A and FIG. 8B are exemplary diagrams of the links between a series of PDRs of a partition when a balanced binary tree structure is used to link the PDRs, in accordance with an embodiment of the present invention. For the sake of illustration, seven PDRs are shown to be associated with the partition in FIG. 8A. Partition hash table 48 points to a PDR 288, which is the current PDR, and which is the seventh PDR (#7) in the series. Prior PDRs are structured as a balanced tree 274. Current PDR 288 points to root PDR 282 of tree 274. Sequentially, root PDR 282 is prior PDR #4, and is shown having branches to two nodes, PDR 278 (#2) and prior PDR 284 (#5). The remaining prior PDRs are arranged in the tree such that no branch is more than one node longer than any other branch, following the methods of balanced binary trees cited above. Three PDRs of FIG. 8A are shown as having no left or right branches, these being PDRs 276, 280, and 286.

FIG. 8B shows changes that are incorporated into balanced tree 274 of FIG. 8A after process 260 (FIG. 7) is performed, thereby adding to the series of PDRs an eighth PDR, indicated as PDR 272 (#8). Hash table 48 is disassociated from PDR 288 and is linked, instead, to the new PDR 272, which becomes the current PDR. PDR 288 is added to balanced tree 274, and the tree is rebalanced. After rebalancing, current PDR 272 points to root PDR 282 (#4). The left branch of PDR 282 points to PDR 278 (#2) and the right branch points to PDR 286 (#6). The remaining prior PDRs are arranged in the tree such that no branch is more than one node longer than any other branch, following the methods of balanced binary trees cited above. Four PDRs of FIG. 8 are shown as having no left or right branches, these being PDRs 276, 280, 284, and 288.

Figure 9:
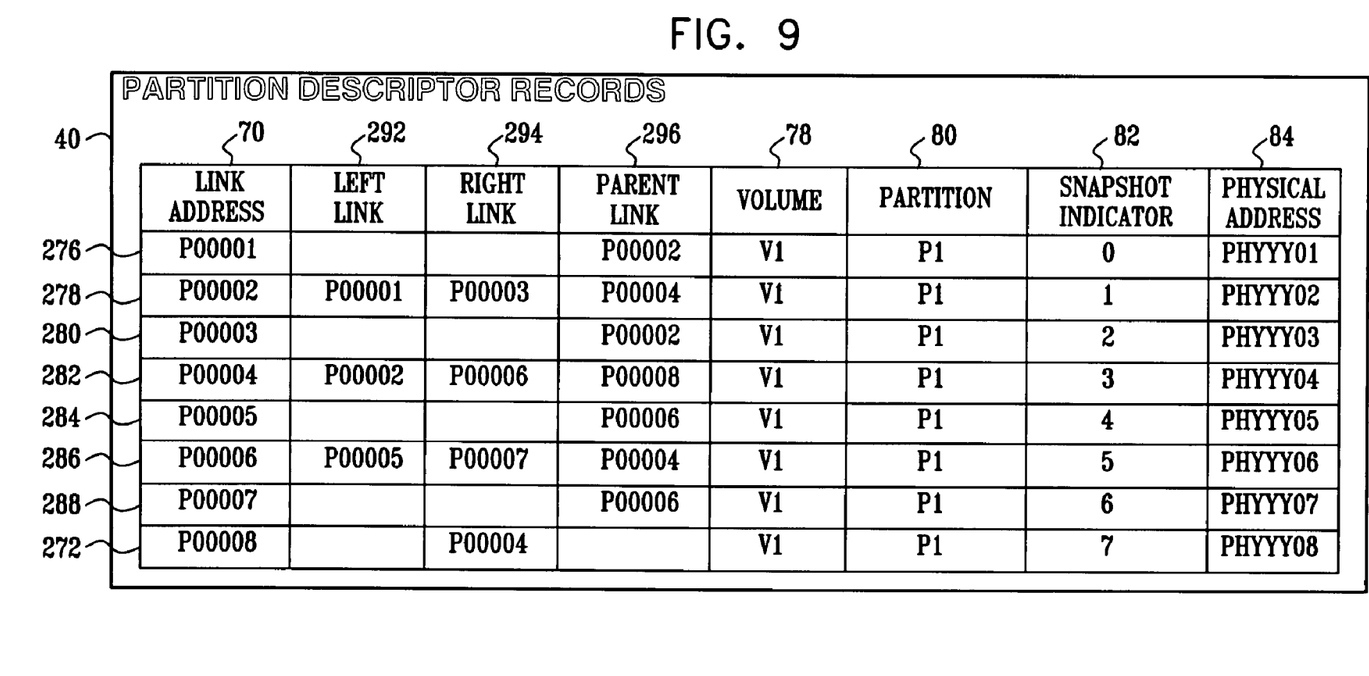
FIG. 9 is a listing of the PDRs of FIG. 8B, in accordance with an embodiment of the present invention.

FIG. 9 is a listing of the PDRs of FIG. 8B, in accordance with an embodiment of the present invention. As indicated in the listing, the prior and forward links (fields 72 and 74, respectively), which are used in the simple linked list structure of FIG. 3B, are replaced by three link fields: left link field 292, right link field 294, and parent link field 296. Current PDR, PDR #8, shown with link address P00008 (corresponding to PDR 272 of FIG. 8B), is linked to root PDR #4 (P00004) by means of the right link field. (Alternatively, any other link field may be used to link the current PDR to the root PDR.) Conversely, root PDR #4 is linked through its parent link field to current PDR #8. As described hereinabove (FIG. 8B), the root PDR has two branches, to PDR #2 and PDR #6, indicated respectively by specifying P00002 in the left link field and P00006 in the right link field.

PDR #2 has two branches, indicated respectively by specifying P00001 in the left link field and P00003 in the right link field. The parent node of PDR #2 is indicated by specifying P00004 in the parent field. The other PDR records in FIG. 9 similarly indicate the links illustrated in FIG. 8B.

In alternate embodiments of the present invention, when PDR 272 is added to the series of PDRs of FIG. 8B, PDR 272 is incorporated directly into the binary tree, and partition hash table 48 is set to point to the root of the binary tree, which may be a PDR other than PDR 272.

In further embodiments of the present invention, the time of a snapshot rather than a snapshot number is used to track snapshots in the system. Processing of read, write, and copy commands is implemented substantially according to processes 200, 230, and 250, respectively; however, the values of the global counter, the snapshot indicator, and the snapshot number are replaced by numbers indicative of the time of the snapshot. That is, GC, which is initially 0, is set equal to the time of a first snapshot rather than being incremented to 1 when a command to create the first snapshot is received. Subsequently, when a write command directed to a partition P1 is implemented in write process 200, SI of the P1 PDR is compared with the time indicated by GC at decision step 210. As before, if SI is less than GC, indicating that the partition has not been overwritten since the last snapshot, then the "yes" branch of the decision step is followed. Similarly, when a read command to a partition P1 is implemented in read process 200, SI of the P1 PDR is compared with the time (SN) indicated by the read command at decision step 238. As before, if SI is not less than SN, indicating that partition is more recent than the snapshot, then the "no" branch is followed and a prior PDR is retrieved.

It may be understood that storage system 10 will operate more efficiently when partition sizes are defined to reflect the size of typical write commands. That is, when commands typically update only a few blocks of a partition, a small partition size, such as 100 blocks, would be more efficient than a larger size. Small partition sizes increase the number of PDRs that must be maintained, but reduce the overall amount of storage space required by the system. An exemplary choice of partition size may be 1 MB for block sizes of ½ KB, in which case a partition comprises 2000 blocks.

Although the embodiments described hereinabove relate to a distributed data storage system serving host computers over a network, it will be appreciated that the principles of the present invention may also be applied, mutatis mutandis, to storage systems in other configurations, such as stand-alone systems serving individual or multiple hosts. The methods described hereinabove may also be applied to additional data storage management commands such as a command to copy a source volume to multiple target volumes, some of which may be read-only volumes. It will thus be appreciated that the embodiments described above are cited by way of example, and the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

We claim:

1. A method for creating snapshots for a logical volume including a plurality of partitions in a data storage system, comprising:

receiving a first write command to write first data to a first physical location associated with a first address in a partition of the logical volume, the logical volume including an associated global counter configured to increment each time a snapshot is taken of the logical volume;

generating a first partition descriptor record (PDR) including a first snapshot indicator, the first snapshot indicator including a same value as a first current value of the global counter;

writing the first data to the first physical location;

subsequent to the first write command, receiving a snapshot command to generate a first snapshot of the partition logical volume;

generating the first snapshot in response to receiving the snapshot command;

receiving a second write command to modify the first data;

modifying the first data to create second data;

comparing the first snapshot indicator and the global counter to determine if the first snapshot was generated prior to receiving the second write command;

writing, based on the comparison, the second data to a second physical location in the partition and generating a second PDR including a second snapshot indicator including a same value as a second current value of the global counter for the second PDR if the global counter is greater than the first snapshot indicator; and writing, based on the comparison, the second data to the first physical location if the global counter is equal to the first snapshot indicator, wherein the second data replaces the first data at the first physical location when the global counter is equal to the first snapshot indicator.

2. The method of claim 1, wherein generating the first PDR comprises generating the first snapshot indicator.

3. The method of claim 1, wherein generating the first PDR comprises associating the partition of the logical volume with the first PDR.

4. The method of claim 3, wherein generating the second PDR comprises disassociating the partition from the first PDR and associating the partition with the second PDR.

5. The method of claim 3, wherein associating the partition with the first PDR comprises generating a further pointer to the first PDR in a partition hash table.

6. The method of claim 1, further comprising generating a pointer between the first PDR and the second PDR, wherein generating the pointer between the first PDR and the second PDR comprises generating a binary tree of a series of PDRs.

7. The method of claim 6, wherein the binary tree is generated by an Adelson-Velskii and Landis (AVL) method.

8. The method of claim 1, wherein the logical volume comprises a source logical volume, wherein the partition comprises a first partition, the method comprising:

responsively to a volume copy command to copy the source logical volume to a target logical volume, generating a third PDR associated with the first physical location; and associating the third PDR with the target logical volume.

9. A method for creating snapshots for a logical volume including a plurality of partitions in a data storage system, comprising:

storing first data at a first address in a partition of the logical volume, the logical volume including an associated global counter;

associating a first partition descriptor record (PDR) with the first address, the first PDR including a first snapshot indicator including a same value as a first current value of the global counter;

receiving a write command to modify the first data;

modifying the first data to create second data;

comparing the first snapshot indicator and the global counter;

writing, based on the comparison, the second data to a second address in the partition and generating a second PDR including a second snapshot indicator including a same value as a second current value of the global counter for the second PDR if the global counter is greater than the first snapshot indicator; and writing, based on the comparison, the second data to the first address if the global counter is equal to the first snapshot indicator, wherein the second data replaces the first data in the first address when the global counter is equal to the first snapshot indicator.

10. The method of claim 9, further comprising generating a pointer between the first PDR and the second PDR, wherein generating the pointer between the first PDR and the second PDR comprises generating a binary tree of a series of PDRs.

11. The method of claim 10, wherein the binary tree is generated by an Adelson-Velskii and Landis (AVL) method.

12. The method of claim 9, wherein the logical volume comprises a source logical volume, wherein the partition comprises a first partition, the method comprising:

responsively to a volume copy command to copy the source logical volume to a target logical volume, generating a third PDR associated with the first physical location; and associating the third PDR with the target logical volume.

13. A system for creating logical volume snapshots, comprising:

a data storage system comprising a logical volume including a plurality of partitions;

means for storing first data at a first address in a partition of the logical volume, the logical volume including an associated global counter;

means for associating a first partition descriptor record (PDR) with the first address, the first PDR including a first snapshot indicator including a same value as a first current value of the global counter;

means for receiving a write command to modify the first data;

means for modifying the first data to create second data;

means for comparing the first snapshot indicator and the global counter;

means for writing, based on the comparison, the second data to a second address in the partition and generating a second PDR including a second snapshot indicator including a same value as a second current value of the global counter for the second PDR if the global counter is greater than the first snapshot indicator; and writing, based on the comparison, the second data to the first address if the global counter is equal to the first snapshot indicator, wherein the second data replaces the first data in the first address when the global counter is equal to the first snapshot indicator.

14. The system of claim 13, further comprising means for generating a pointer between the first PDR and the second PDR, wherein the means for generating the pointer between the first PDR and the second PDR comprises means for generating a binary tree of a series of PDRs.

15. The system of claim 14, wherein the binary tree is generated utiliziing an Adelson-Velskii and Landis (AVL) method.

16. The system of claim 13, wherein the logical volume comprises a source logical volume, wherein the partition comprises a first partition, the system comprising:

means for generating a third PDR associated with the first physical location in response to receiving a volume copy command to copy the source logical volume to a target logical volume; and means for associating the third PDR with the target logical volume.

* * * * *